(12) United States Patent
Moll

(10) Patent No.: US 9,260,082 B2
(45) Date of Patent: Feb. 16, 2016

(54) WIPER ARM ASSEMBLY HAVING PIVOTAL COVER ALLOWING ACCESS TO PIVOT SHAFT

(71) Applicant: TRICO PRODUCTS CORPORATION, Rochester Hills, MI (US)

(72) Inventor: Kyle Moll, Oxford, MI (US)

(73) Assignee: TRICO PRODUCTS CORPORATION, Rochester Hills, MI (US)

( * ) Notice: Subject to any disclaimer, the term of this patent is extended or adjusted under 35 U.S.C. 154(b) by 156 days.

(21) Appl. No.: 13/733,523

(22) Filed: Jan. 3, 2013

(65) Prior Publication Data

US 2014/0182076 A1    Jul. 3, 2014

(51) Int. Cl.
*B60S 1/34* (2006.01)

(52) U.S. Cl.
CPC .............. *B60S 1/3484* (2013.01); *B60S 1/345* (2013.01); *B60S 1/3481* (2013.01)

(58) Field of Classification Search
CPC ........ B60S 1/34; B60S 1/3436; B60S 1/3459; B60S 1/3481; B60S 1/342; B60S 1/3434; B60S 1/3431; B60S 1/3438; B60S 1/344; B60S 1/3454; B60S 1/3452; B60S 1/345
USPC ............ 15/250.351, 250.352, 250.34, 250.31
See application file for complete search history.

(56) References Cited

U.S. PATENT DOCUMENTS

| | | | |
|---|---|---|---|
| 2,215,371 A | 9/1940 | Horton | |
| 3,126,216 A | 3/1964 | Krohm | |
| 3,512,205 A | 5/1970 | Reister et al. | |
| 3,729,767 A * | 5/1973 | Edele et al. | 15/250.34 |
| 5,233,720 A | 8/1993 | Schoen | |
| 5,647,680 A * | 7/1997 | Bienert et al. | 403/263 |
| 6,658,691 B2 | 12/2003 | Muramatsu | |

(Continued)

FOREIGN PATENT DOCUMENTS

| | | |
|---|---|---|
| DE | 43 33 554 A1 | 10/1994 |
| DE | 196 23 597 A1 | 12/1997 |

(Continued)

OTHER PUBLICATIONS

Machine translation of description portion of WO 82/02692, published Jun. 1993.*

(Continued)

*Primary Examiner* — Gary Graham
(74) *Attorney, Agent, or Firm* — Howard & Howard Attorneys PLLC

(57) ABSTRACT

A wiper arm assembly is adapted to support a wiper blade as it moves across a surface to be wiped. The wiper arm assembly includes a body and a head supported by the body and adapted to be mounted to a pivot shaft that defines a pivot axis P and drives the wiper blade in an oscillating manner across the surface to be wiped. The body also includes an opening providing access to the head mounted to the pivot shaft. The wiper arm assembly includes a cover pivotally mounted to the body at the opening and is movable about an axis A substantially perpendicular to the pivot axis P from a first position closing the opening to a second position allowing access to the head. A locking mechanism on the cover locks the cover to a nut on the pivot shaft to retain the cover in the first position closing the opening.

19 Claims, 4 Drawing Sheets

(56) References Cited

U.S. PATENT DOCUMENTS

| | | |
|---|---|---|
| 6,665,903 B2 | 12/2003 | Tsukamoto et al. |
| 6,687,949 B2 | 2/2004 | Zimmer |
| 2002/0152575 A1 | 10/2002 | Tsukamoto et al. |
| 2005/0120503 A1 | 6/2005 | Park et al. |
| 2007/0136975 A1 | 6/2007 | Van De Rovaart |

FOREIGN PATENT DOCUMENTS

| | | |
|---|---|---|
| DE | 196 53 033 A1 | 6/1998 |
| DE | 102 17 600 A1 | 11/2002 |
| DE | 10 2004 017 447 A1 | 11/2005 |
| DE | 10 2008 034 373 A1 | 2/2010 |
| EP | 0 753 439 A1 | 1/1997 |
| FR | 2 543 897 | 10/1984 |
| FR | 2 746 740 | 10/1997 |
| FR | 2 746 750 | 10/1997 |
| FR | 2 774 050 | 3/1999 |
| GB | 642188 | 8/1950 |
| GB | 756229 | 9/1956 |
| GB | 1 435 778 | 5/1976 |
| JP | 2000 95070 | 4/2000 |
| JP | 2001 247015 | 9/2001 |
| JP | 2001 301580 | 10/2001 |
| JP | 2002 120696 | 4/2002 |
| JP | 2006-51834 A | 2/2006 |
| JP | 2006 76522 | 3/2006 |
| JP | 2006 76523 | 3/2006 |
| JP | 2006 213325 | 8/2006 |
| JP | 2006 248329 | 9/2006 |
| JP | 2006 281954 | 10/2006 |
| JP | 2006 298146 | 11/2006 |
| JP | 2006 298278 | 11/2006 |
| JP | 2007 153152 | 6/2007 |
| JP | 2007 153153 | 6/2007 |
| JP | 2008 94376 | 4/2008 |
| JP | 2008 168831 | 7/2008 |
| JP | 2010-83262 A | 4/2010 |
| WO | WO 82/02692 * | 8/1982 |

OTHER PUBLICATIONS

Apr. 14, 2014 International Search Report and Written Opinion for PCT/US2013/078001.

* cited by examiner

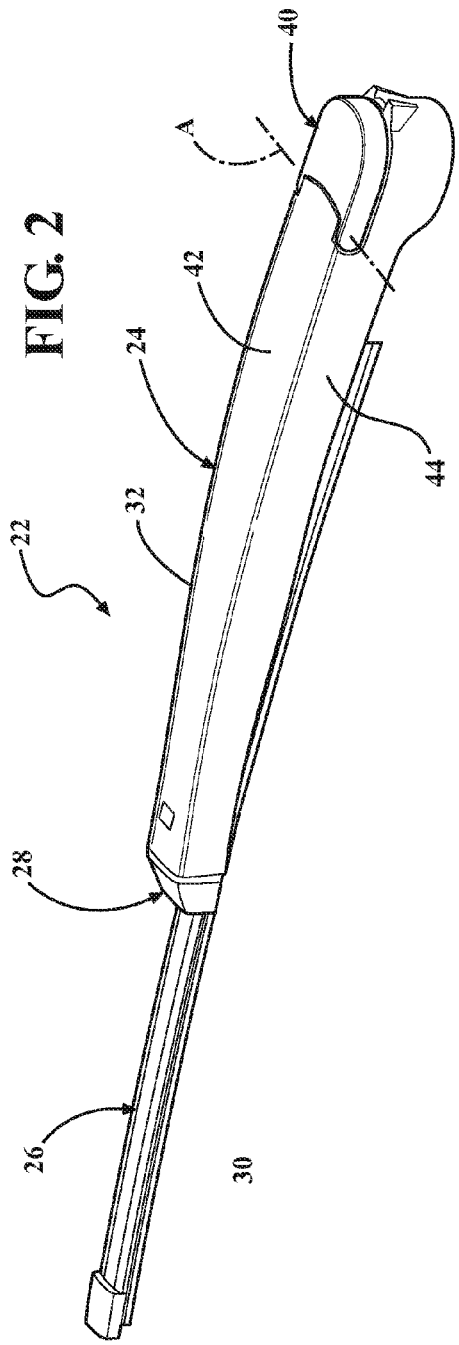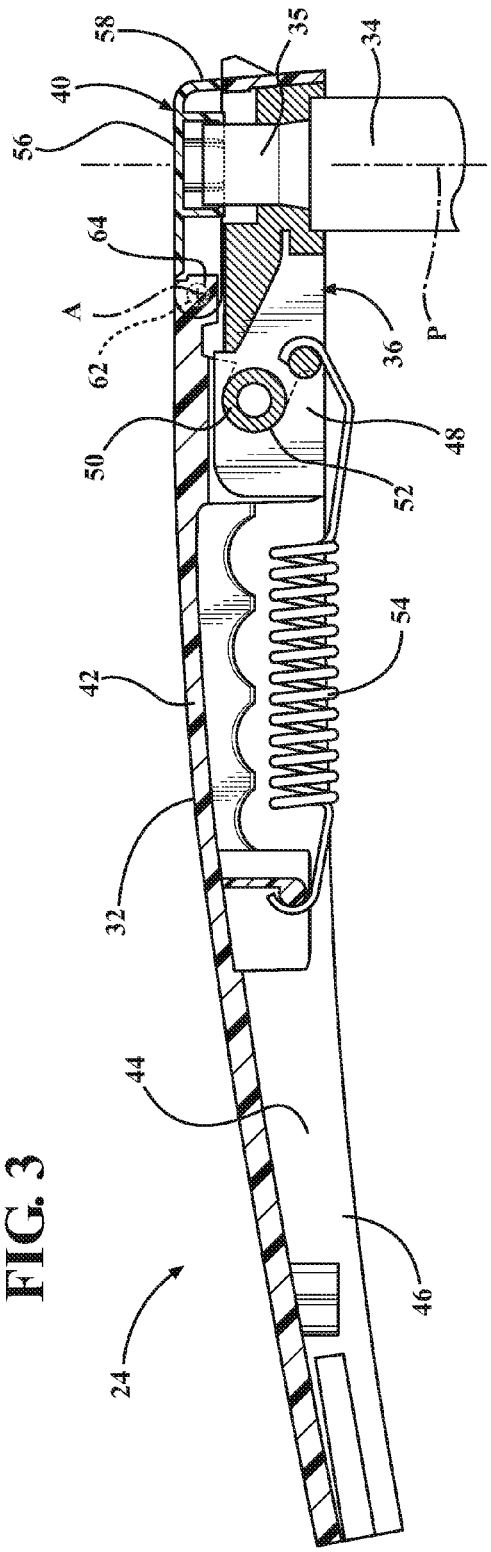

us 9,260,082 B2

WIPER ARM ASSEMBLY HAVING PIVOTAL COVER ALLOWING ACCESS TO PIVOT SHAFT

BACKGROUND OF THE INVENTION

1. Field of the Invention

The present invention relates generally to wiper systems for vehicles and, more specifically, to a wiper arm assembly for a wiper system of a vehicle that is adapted to support a wiper assembly as it moves across a surface to be wiped and having a pivotal cover that allows access to a pivot shaft.

2. Description of the Related Art

Conventional wiper systems known in the related art include some type of wiper assembly mounted to a wiper arm assembly, which, in turn, is mounted adjacent to a surface to be wiped, such as a windshield. The wiper arm assembly is pivotally driven to impart reciprocal motion to the wiper assembly across the windshield. The wiper assembly includes a wiping element that contacts the windshield across the surface to be wiped. The wiper assembly is commonly either of the "tournament" or "beam blade" type. Both types of wiper assemblies commonly known in the related art typically incorporate one or more metal strips that act to reinforce the wiping element and facilitate wiping contact by the wiping element across what is typically a curved surface. In this context, the wiper arm assembly delivers a downward force to the wiper assembly that is distributed thereacross, pressing the wiping element into contact with the surface to be wiped.

The wiper arm assembly is typically driven by an electric motor through a pivot shaft. The wiper arm assembly is mounted to the shaft via a head. Some wiper arm assemblies include an opening that allows access to the head at the pivot shall and a removable cover is often employed to close the opening when access to the connection between the head and the pivot shaft is not needed.

While such wiper systems known in the related art have generally worked for their intended purposes, some deficiencies still remain. Many covers of these type are susceptible to unintentional latching prior to assembly and may require an extra component for final assembly. Moreover, the covers do not stay up prior to assembly, making final assembly difficult. Farther, the covers may result in more assembly effort of the wiper arm. Moreover, covers of these type are also susceptible to snagging on brushes or cloths, typically employed in car washes, and can be inadvertently removed from the arm and thus lost during this process. These problems are not limited to, but are especially prevalent in connection with wiper systems used to clean a rear window of the vehicle.

Thus, there remains a need in the art for a wiper arm assembly that employs a cover that efficiently and effectively provides for access to the pivot shaft, but which is not susceptible to unintentional latching prior to assembly and which is not easily dislodged or inadvertently removed during the process of washing the car and other interference with the wiper arm assembly.

SUMMARY OF THE INVENTION

The present invention overcomes many limitations and disadvantages in the related art in a wiper arm assembly that is adapted to support a wiper assembly as it moves across a surface to be wiped. The wiper arm assembly includes a body and a head supported by the body and adapted to be mounted to a pivot shaft that defines a pivot axis and drives the wiper assembly in an oscillating manner across the surface to be wiped. The body also includes an opening providing access to the head mounted to the pivot shaft. The wiper arm assembly also includes a cover pivotally mounted to the body at the opening and is movable about an axis substantially perpendicular to the pivot axis from a first position closing the opening to a second position allowing access to the pivot shaft. The wiper arm assembly includes a locking mechanism on the cover to lock the cover to a nut on the pivot shaft to retain the cover in the first position closing the opening.

In this way, the wiper arm assembly of the present invention employs a cover that efficiently and effectively provides access to the pivot shaft, but that is not easily dislodged or inadvertently removed during the process of washing the vehicle and other interference with the wiper arm. The wiper arm assembly of the present invention combines a nut retention feature with a hinge feature, eliminating an extra component for final assembly. The wiper arm assembly of the present invention provides for locking of the cover to the nut, eliminating the issue with unintentional latching prior to assembly. The wiper arm assembly of the present invention includes a detent feature holding the cover up prior to assembly and also eases the assembly operation. The wiper arm assembly of the present invention allows for the reduction of an extra component shipped into an automotive assembly plant and for service. The wiper arm assembly of the present invention reduces the assembly effort of the wiper arm.

Other objects, features, and advantages of the present invention will be readily appreciated as the same becomes better understood after reading the subsequent description taken in connection with the accompanying drawings.

BRIEF DESCRIPTION OF THE DRAWINGS

FIG. 2 is a perspective view of a wiper arm assembly of the present invention for the wiper system of FIG. 1.

FIG. 3 is a cross-sectional side view of the wiper arm assembly of the present invention.

DETAILED DESCRIPTION OF THE PREFERRED EMBODIMENT(S)

Figure 1:
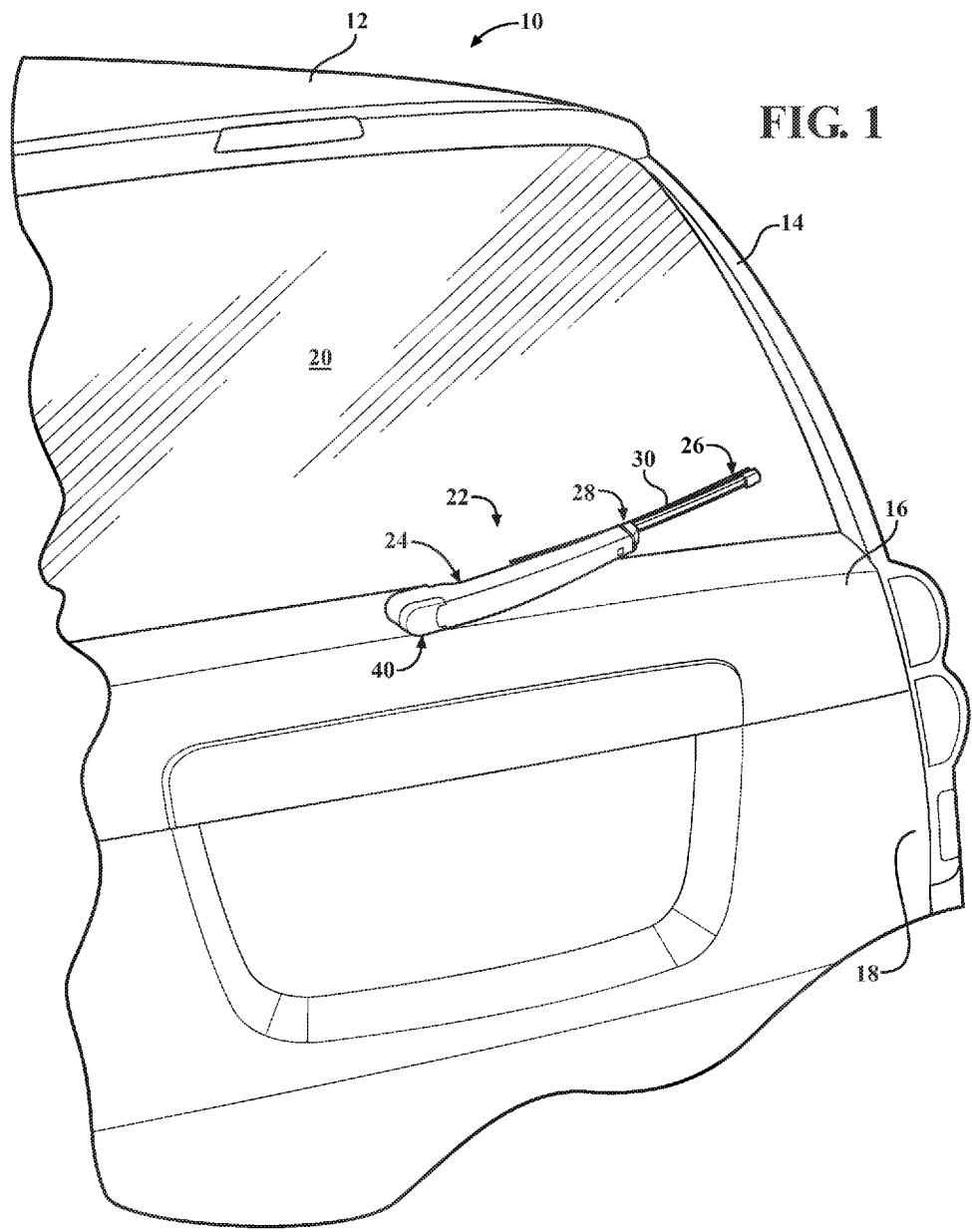
FIG. 1 is a partial perspective view of a rear of a vehicle having a wiper system incorporating a wiper arm assembly according to the present invention.
Figure 4:
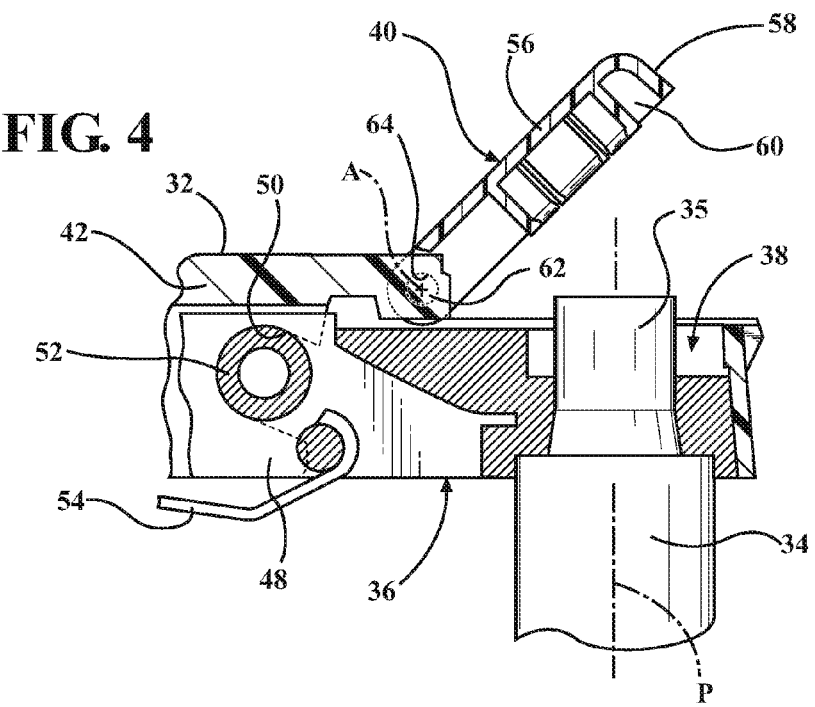
FIG. 4 is a cross-sectional side view of one end of the wiper arm assembly of the present invention illustrating a cover disposed between its fully closed position and fully opened position.
Figure 5:
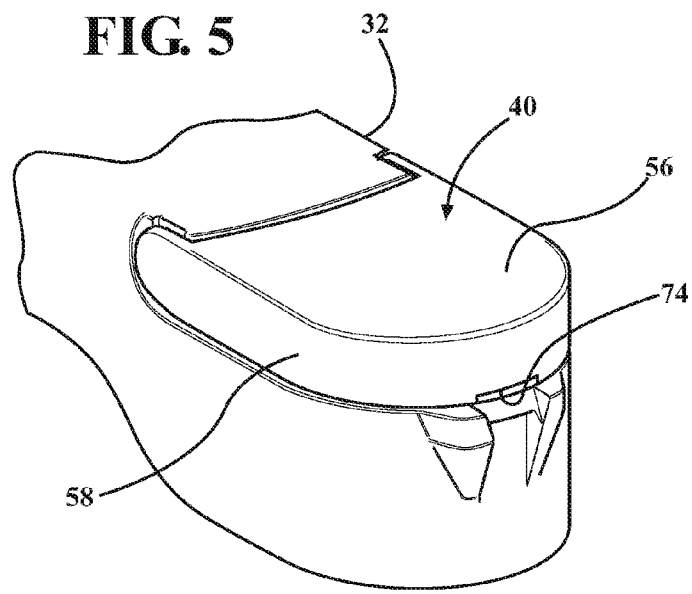
FIG. 5 is a partial perspective view of one end of the wiper arm assembly of the present invention illustrating the cover disposed in its fully closed position.

Referring now to the figures, where like numerals are used to designate like structure, a portion of a vehicle is schematically illustrated at 10 in FIG. 1. More specifically, the portion of the vehicle that has been employed to illustrate the present invention includes a generic illustration of a rear of a vehicle. Thus, the vehicle 10 includes a roof 12, a pair of pillars 14 (only one of which is shown in FIG. 1), a lift gate 16, and a rear 18 of the vehicle 10. A glass rear window 20 extends between the pillars 14 on the lift gate 16. While the rear of the vehicle 10 illustrated herein employs a lift gate 16, those having ordinary skill in the art will appreciate from the description that follows that the vehicle 10 could include a hatch back or any other commonly known configuration without departing from the scope of the present invention.

A wiper system is generally shown at 22 in FIG. 1 and in the embodiment illustrated herein, is employed to clean the rear window 20. The wiper system 22 includes a wiper arm assembly, generally indicated at 24, and a wiper assembly, generally indicated at 26, (hereinafter referred to as a "wiper blade"). In the embodiment illustrated herein, the wiper arm assembly 24 is operatively mounted to the lift gate 16 and is moveable in an oscillating fashion to move the wiper blade 26 across the rear window 20. The wiper blade 26 is releasably engaged to the wiper arm assembly 24 via a coupler assembly, generally indicated at 28, that operatively interconnects the wiper blade 26 and wiper arm assembly 24. The wiper blade 26 is adapted to clean the surface to be wiped, in this case, the rear window 20. It should be appreciated by those having ordinary skill in the art that the wiper system 22 may include other components besides the wiper arm assembly 24 and wiper blade 26. Furthermore, it should be appreciated by those having ordinary skill in the art that the wiper arm assemblies 24 and wiper blades 26 may be employed in other areas of the vehicle 10, such as a front windshield (not shown) or a head lamp (not shown) that employs a wiper system. Thus, it will be understood that the present invention is not limited for use solely in connection with wiper arm assemblies 24 adjacent to a vehicle's rear window 20, but for use in all applications where wiper blades 26 are employed.

The wiper blade 26 includes a wiping element 30 that has a predetermined length and cross-sectional profile corresponding to a particular application and is typically manufactured through an extrusion process, which enables the length and cross-sectional profile of the wiping element 30 to be easily adjusted without a substantial increase to manufacturing expense. Furthermore, the wiping element 30 is constructed from a flexible rubber. It should be appreciated by those having ordinary skill in the art that the wiping element 30 may be constructed from any flexible material, such as silicone or other polymer, and via any manufacturing process, such as injecting molding, without departing from the scope of the present invention.

Those having ordinary skill in the art will also appreciate that the wiper blade 26 may be of either the tournament or beam blade type having any standard construction as is commonly known in the art. Thus, whether the wiper blade 26 is a tournament or beam style blade, it will generally distribute downward pressure from the wiper arm assembly 24 across the wiping element 30. Moreover, the wiper blade 26 may be curved longitudinally with a predetermined radius of curvature that is the same or greater than the plane of curvature of the rear window 20, if any. This predetermined radius of curvature is sometimes referred to in the related art as a "free form" radius of curvature (hereinafter "windshield curvature"). Accordingly, the curvature of the wiper blade 26 may be symmetrical or asymmetrical depending on the force requirements and the contour of the surface to be wiped. The flexible, free form, pre-curved wiper blade 26 straightens out when the wiper arm assembly 24 applies a force thereto to flatten it and direct the wiping element 30 to contact the surface to be wiped. Thus, the wiper blade 26 may include a free-form curvature that ensures force distribution on rear windows 20 or windshields having various curvatures that effects proper wrapping about the surface to be wiped. The wiper blade 26 may also include an airfoil (not shown) to reduce the likelihood of wind lift during operational movement across the surface to be wiped. However, it should be appreciated by those having ordinary skill in the art that the airfoil is optional especially where the wiper blade 26 is employed on the rear window 20.

Figure 6:
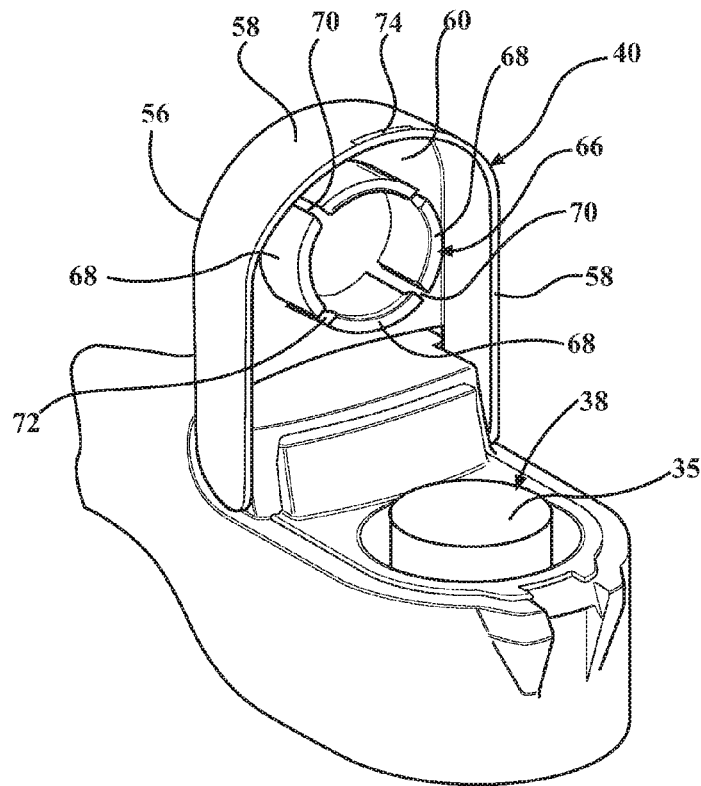
FIG. 6 is a partial perspective view of one end of the wiper arm assembly of the present invention illustrating the cover in its fully opened position.
Figure 7:
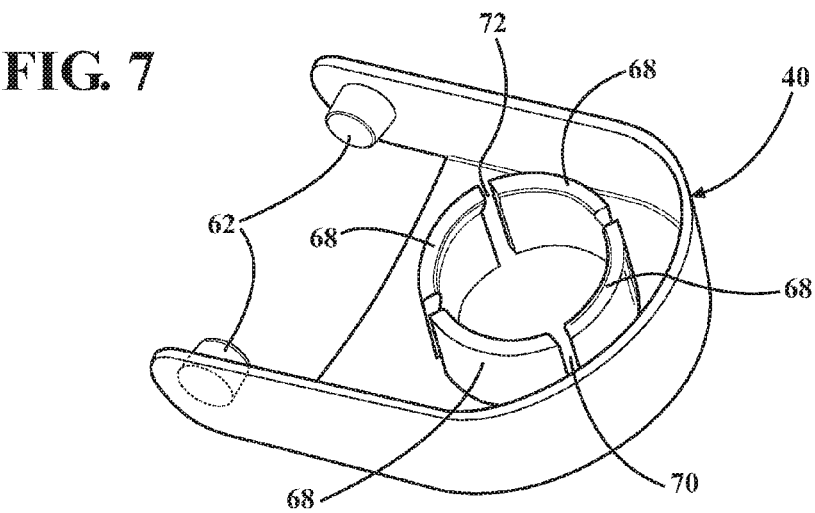
FIG. 7 is a perspective bottom view of the cover for the wiper arm assembly of the present invention.

Referring to FIGS. 2 through 7, the wiper arm assembly 24 includes an elongated body 32 forming a wiper arm. The elongated body 32 is operatively mounted to a pivot shaft 34, which, in turn, is driven by an electrical motor (not shown) either directly or through appropriate linkages as is commonly known in the art. To this end, the wiper arm assembly 24 includes a head, generally indicated at 36, that is supported on the body 32 and adapted to be mounted to the pivot shaft 34 that defines a pivot axis P and drives the wiper blade 26 in an oscillating manner across the surface to be wiped. The head 36 is operatively mounted to the pivot shaft 34 via a nut 35 threaded onto the distal end of the pivot shaft 34 or via any suitable fastener known in the related art. The wiper arm assembly 24 includes an opening 38 (FIGS. 4 and 6) in the body 32 that provides access to the head 36 and to the pivot shaft 34. The wiper arm assembly 24 also includes a cover, generally indicated at 40, mounted to the body 32 at the opening 38 and is movable about an axis A substantially perpendicular to the pivot axis P from a first position closing the opening (FIG. 5) to a second position allowing access to the head 36 and the pivot shaft 34 (FIG. 6). Each of these components of the wiper arm assembly 24 will be described in greater detail below.

More specifically, the body 32 has a top wall 42 and side walls 44 depending from the top wall 42 so as to define an inversely open ended U-shape with an interior cavity 46. The head 36 is operatively supported by the body 32 in the interior cavity 46. To this end, the body 32 may include a pair of opposed bosses 48 formed on the interior cavity 46 opposite one another and that present a pair of inwardly facing openings 50. The head 36 may employ a pair of bearings 52 that are cooperatively received in the inwardly facing openings 50 such that the head 36 and body 32 may pivot relative to each other about an axis defined by the bearings 52. The wiper arm assembly 24 may include a biasing member 54, such as a coiled spring, disposed in the interior cavity 46 of the body 32 and operatively connected between the head 36 and the body 32 as is commonly known in the art. It should be appreciated that the biasing member 54 generates a downward force on the wiper blade 26 as it oscillates across the surface to be wiped.

The inwardly facing openings 50 open in a direction that is below an imaginary horizontal line extending through the center of the bearings 52. The bearings 52 are disposed in sliding engagement with the opposed bosses 48. The downwardly angled inwardly facing openings 50 of the bearings 52 essentially captures the head 36 during assembly under the force provided by the biasing member 54. At the same time, this interaction allows rotation between the body 32 and the head 36. Moreover, the interaction of the bosses 48 with the bearings 52 functions as a bearingless joint between the body 32 and the head 36. Thus, the biasing member 54 retains the body 32 relative to the head 36 during use without the need of a rivet. The top wall 42 and sidewalls 44 of the body 32 essentially envelopes the arm/head joint from both sides as well as from the top. This arrangement offers protection from snow and ice buildup that commonly causes conventional wiper arms to freeze during wintery weather conditions causing loss of arm load resulting in poor wipe quality. The internal joint formed between the opposed bosses 48 and the bearings 52 also offer superior serviceability by allowing the arm body 32 to be rotated about the axes defined between the bosses 48 and bearings 52 while maintaining excellent lateral strength. In addition, the operative interaction between the head 36 and body 32 requires no tools or fastening mechanisms and all components can be assembled by hand. Thus, the operation of the body 32 relative to the head 36 effectively lowers the cost of the joint formed therebetween.

Referring now to FIGS. 3 through 7, the cover 40 includes a top wall 56 and side walls 58 depending therefrom to form an interior cavity 60. The cover 40 includes a hinge pin 62 extending from each of opposed side walls 58 at a free end thereof into the interior cavity 60 that extends substantially perpendicular to the pivot axis P defined by the pivot shaft 34. The hinge pin 62 is generally cylindrical in shape and has a generally circular cross-sectional shape. The body 32 includes an opening 64 extending transversely therethrough that receives the hinge pin 62 from each side wall 58 and retains the hinge pins 62 in a direction perpendicular to the pivot axis P but that allows rotational movement of the hinge pin 56 about the axis A that is perpendicular to the pivot axis P. Thus, with reference to FIGS. 3 through 6, those having ordinary skill in the art will appreciate that the cover 40 of the present invention pivots or rotates about the axis A.

The cover 40 also includes a locking mechanism, generally indicated at 66, that releasably engages the nut 35 when the cover 40 is in the first position closing the opening 38. The locking mechanism 66 includes at least one, preferably a plurality of retention members 68 extending from the top wall 56 into the interior cavity 60 and spaced from the side walls 58. The retention members 68 are spaced circumferentially from each other to form spaces 70 therebetween. In the embodiment illustrated, there are four retention members 68. Each of the retention members 68 is generally rectangular and arcuate in cross-sectional shape. Each of the retention members 68 have a lip 72 extending inwardly at a free end thereof to engage the nut 35 and cause the retention members 68 to flex and grasp the exterior or outside surface of the nut 35 when the cover 40 is moved to the first position closing the opening 38.

The cover 40 further includes a recess or boss 74 at the arcuate end of the side walls 58. The recess 74 allows a tool such as a screwdriver or finger of a person to unlock the cover 40 from the nut 35. The recess 74 is adapted for the tool or finger to be engaged therein to move the cover 40 upwardly for releasable engagement with the nut 35 so as to be snapped fit relative to the body 32.

In its operative mode, and when access is desired to the joint formed between the head 36 and the pivot shaft 34, a tool such as a screwdriver or finger of a person to unlock the cover 40 from the nut 35. The recess 74 is adapted for the tool or finger to be engaged therein to move the cover 40 upwardly for releasable engagement with the nut 35 and the cover 40 is moved upwardly, thereby releasing the retention members 68 from the nut 35 and the cover 40 is rotated about the axis A defined by the hinge pins 62 and that is perpendicular to the axis P defined by the pivot shaft 34 such that the cover 40 is moved from its first closed position (FIG. 5) to its second, open position (FIG. 6). The wiper arm assembly 24 may be quickly and easily mounted or removed from the pivot shaft 34 via the access to this joint through the opening 38. Once the wiper arm assembly 24 has been suitably mounted, the cover 40 may be swiveled about the axis A defined by the hinge pin 62 until the locking mechanism 66 once again engages the nut 35 and the cover 40 closes the opening 38.

In this way, the wiper arm assembly 24 of the present invention employs a head cover 40 that efficiently and effectively provides for access to the head 36 and the pivot shaft 34, but that is not susceptible to intrusion by water, snow, or ice and that is not easily dislodged or inadvertently removed during the process of washing the car and other interference with the wiper arm.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A wiper arm assembly adapted to support a wiper blade as it moves across a surface to be wiped, said wiper arm assembly comprising:
a body and a head supported by said body and adapted to be mounted to a pivot shaft that defines a pivot axis and drives the wiper blade in an oscillating manner across the surface to be wiped, said body defining an interior cavity and including an opening providing access to said head mounted to the pivot shaft, said body further including a pair of opposed bosses formed on said interior cavity opposite to one another so as to define inwardly facing openings, said head including a pair of bearings that are cooperatively received in the inwardly facing openings such that the head and body may pivot relative to each other about an axis defined by the bearings;
a cover pivotally connected to said body at said opening and movable about an axis substantially perpendicular to the pivot axis from a first position closing said opening to a second position allowing access to said head; and
a locking mechanism on said cover to lock said cover to a nut on the pivot shaft to retain said cover in said first position closing the opening.

2. A wiper arm assembly as set forth in claim 1 wherein said locking mechanism comprises at least one flexible retention member adapted for releasable engagement with the nut.

3. A wiper arm assembly as set forth in claim 2 wherein said locking mechanism comprises a plurality of flexible retention members spaced circumferentially and adapted for releasable engagement with the nut.

4. A wiper arm assembly as set forth in claim 3 wherein said flexible retention members have a lip at a free end thereof extending inwardly to engage an outer surface of the nut.

5. A wiper arm assembly as set forth in claim 1 wherein said cover includes at least one hinge pin extending substantially perpendicular to the pivot axis.

6. A wiper arm assembly as set forth in claim 5 wherein said body including an opening that receives said at least one hinge pin and retains said at least one hinge pin for rotational movement about said axis that is perpendicular to the pivot axis.

7. A wiper arm assembly as set forth in claim 6 wherein said cover defines a top wall and side walls depending therefrom to form an interior cavity of said cover.

8. A wiper arm assembly as set forth in claim 7 wherein said at least one hinge pin comprises a cylindrical shaft extending inwardly into said interior cavity of said cover from a free end of said side walls.

9. A wiper arm assembly as set forth in claim 6 wherein said locking mechanism comprises a plurality of flexible retention members spaced circumferentially and cantilevered from said top wall and extending into said interior cavity of said cover and spaced from said side walls.

10. A wiper arm assembly as set forth in claim 7 wherein said cover includes a recess in one of said side walls to allow a tool or finger to engage and move said cover.

11. A wiper system for a vehicle comprising:
a wiper blade adapted to contact a surface to be wiped, a wiper arm assembly adapted to support said wiper blade as it moves across a surface to be wiped, and a coupler assembly that operatively interconnects said wiper blade and said wiper arm assembly;
said wiper arm assembly including a body and a head supported by said body and adapted to be mounted to a pivot shaft that defines a pivot axis and drives the wiper blade in an oscillating manner across the surface to be wiped, said body defining an interior cavity and including an opening providing access to said head mounted to the pivot shaft, said body further including a pair of opposed bosses formed on said interior cavity opposite to one another so as to define inwardly facing openings, said head including a pair of bearings that are cooperatively received in the inwardly facing openings such that the head and body may pivot relative to each other about an axis defined by the bearings;
a cover pivotally mounted to said body at said opening and movable about an axis substantially perpendicular to the pivot axis from a first position closing said opening to a second position allowing access to said head, said cover having at least one flexible retention member to lock said cover to a nut on the pivot shaft to retain said cover in said first position closing the opening.

12. A wiper system as set forth in claim 11 wherein said locking mechanism comprises a plurality of flexible retention members spaced circumferentially and adapted for releasable engagement with the nut.

13. A wiper system as set forth in claim 12 wherein said flexible retention members have a lip at a free end thereof extending inwardly to engage an outer surface of the nut.

14. A wiper system as set forth in claim 11 wherein said cover includes at least one hinge pin extending substantially perpendicular to the pivot axis.

15. A wiper system as set forth in claim 14 wherein said body includes an opening that receives said at least one hinge pin and retains said at least one hinge pin for rotational movement about said axis that is perpendicular to the pivot axis.

16. A wiper system as set forth in claim 11 wherein said cover defines a top wall and side walls depending therefrom to form an interior cavity of said cover.

17. A wiper system as set forth in claim 16 wherein said at least one flexible retention member extends cantilevered from said top wall into said interior cavity of said cover and spaced from said side walls.

18. A wiper system as set forth in claim 16 wherein said cover includes a recess in one of said side walls to allow a tool or finger to engage and move said cover.

19. A wiper arm assembly adapted to support a wiper blade as it moves across a surface to be wiped, said wiper arm assembly comprising:
a body and a head supported by said body and adapted to be mounted to a pivot shaft that defines a pivot axis and drives the wiper blade in an oscillating manner across the surface to be wiped, said body defining an interior cavity and including an opening providing access to said head mounted to the pivot shaft, said body further including a pair of opposed bosses formed on said interior cavity opposite to one another so as to define inwardly facing openings, said head including a pair of bearings that are cooperatively received in the inwardly facing openings such that the head and body may pivot relative to each other about an axis defined by the bearings;
a cover pivotally connected to said body at said opening and movable about an axis substantially perpendicular to the pivot axis from a first position closing said opening to a second position allowing access to said head; and
said cover comprising a top wall and side walls depending therefrom to form an interior cavity, a pair of opposed hinge pins extending from a free end of said side walls substantially perpendicular to the pivot axis to be received in an opening of said body for rotational movement about said axis that is perpendicular to the pivot axis, and a plurality of flexible retention members extending from said top wall and into said interior cavity of said cover and spaced circumferentially with a lip at a free end thereof extending inwardly to engage an outer surface of a nut on the pivot shaft to retain said cover in said first position closing the opening.

\* \* \* \* \*